United States Patent
Kelch et al.

(10) Patent No.: US 12,194,625 B2
(45) Date of Patent: Jan. 14, 2025

(54) GENERAL FIXTURE FOR ROBOTIC ASSEMBLY PROCESSES

(71) Applicant: Intrinsic Innovation LLC, Mountain View, CA (US)

(72) Inventors: Timothy Robert Kelch, San Jose, CA (US); Ning Ye, Palo Alto, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 383 days.

(21) Appl. No.: 17/717,536

(22) Filed: Apr. 11, 2022

(65) Prior Publication Data

US 2023/0321815 A1 Oct. 12, 2023

(51) Int. Cl.
*B25J 9/00* (2006.01)
*B25H 1/12* (2006.01)
*B25J 9/16* (2006.01)

(52) U.S. Cl.
CPC .............. *B25J 9/0096* (2013.01); *B25H 1/12* (2013.01); *B25J 9/1664* (2013.01); *B25J 9/1687* (2013.01)

(58) Field of Classification Search
CPC ...... B25J 9/0096; B25J 9/1664; B25J 9/1687; B25H 1/12; B25H 1/02; G05B 2219/40519
USPC .......................................................... 700/89
See application file for complete search history.

(56) References Cited

U.S. PATENT DOCUMENTS

| | | | |
|---|---|---|---|
| 4,964,211 A | 10/1990 | Arao et al. | |
| 5,771,553 A * | 6/1998 | Sim | B25J 9/1687 29/701 |
| 8,136,232 B1 | 3/2012 | Yu et al. | |
| 9,878,451 B2 | 1/2018 | Ito et al. | |
| 10,492,350 B2 | 11/2019 | Yokoyama et al. | |
| 2018/0212392 A1 | 7/2018 | Yu et al. | |
| 2018/0341730 A1 * | 11/2018 | Atherton | B25J 9/1687 |
| 2020/0008333 A1 | 1/2020 | Iwaki | |
| 2020/0398492 A1 * | 12/2020 | Corkum | B25J 15/06 |

(Continued)

FOREIGN PATENT DOCUMENTS

WO WO-2011153156 A2 * 12/2011 ............ B25J 9/1692

OTHER PUBLICATIONS

[No Author Listed] [online], "Circuit Board Assembly with a Fanuc Scara Robot [2020]," retrieved on Dec. 13, 2022, <https://www.youtube.com/watch?v=qj8B-zL64FE>, 111 pages [Video Submission].

(Continued)

*Primary Examiner* — Chun Cao

(74) *Attorney, Agent, or Firm* — Fish & Richardson P.C.

(57) ABSTRACT

Methods, systems, and apparatus, including computer programs encoded on computer storage media, for using a general fixture for robotic motion planning. One of the methods includes receiving a request to generate a motion plan for manipulating a component that is part of a robotic assembly process in an operating environment, the operating environment including a fixture having a base and a mesh surface, the mesh surface having openings that are configured to constrain the orientation of the component that is part of the robotic assembly process; in response, generating a motion plan that when executed causes a robot to place an instance of the component on the mesh surface.

20 Claims, 5 Drawing Sheets

(56) References Cited

U.S. PATENT DOCUMENTS

2021/0370513 A1* 12/2021 Dai .................. B25J 9/1664
2023/0279512 A1* 9/2023 Masters ............ B01L 3/502761
435/5

OTHER PUBLICATIONS

[No Author Listed] [online], "Fixtures in PCB Assembly," retrieved on Dec. 13, 2022, <https://www.youtube.com/watch?v=x49pcwvN7Fo>, 263 pages [Video Submission].

[No Author Listed] [online], "Printed circuit board assembly process," retrieved on Dec. 16, 2022, <https://www.youtube.com/watch?v-O7snFb1JFMU>, 405 pages [Video Submission].

* cited by examiner

GENERAL FIXTURE FOR ROBOTIC ASSEMBLY PROCESSES

BACKGROUND

This specification relates to robotics, and more particularly to using a general fixture for a robotic assembly process.

In robotics systems, the physical robotic movements to perform tasks are often precisely scheduled by manual pre-programming. For example, a warehouse robot that moves boxes can be programmed to pick up a box at the entrance of a warehouse, move it, and put it down in a target zone of the warehouse. For another example, a construction robot can be programmed to pick up a beam and put it down onto a bridge deck. As each of these actions can include many movements that require high precision, a slight error in the measurement of a robot pose or an object orientation can result in failure of the task. Moreover, errors at an early stage in the process can result in accumulated errors that could cause task failures at a later stage.

In some assembly processes, a fixture can be used to hold or support a component that is used for an assembly process. However, setting up a fixture tends to be time-consuming and expensive. For example, a fixture needs to first be designed very precisely to correspond to the components it will hold. This can include, for example, drilling precise through holes to receive through-hole elements, e.g., pins, on a component to be held by the fixture. Furthermore, setting up a robot to use the fixture requires very precise and accurate calibration. In addition, a traditional fixture is designed with particular opening locations and topology for a particular component. Moreover, new fixtures need to be designed, manufactured, and set up whenever there is a new or different component being used for assembly.

SUMMARY

This specification describes techniques related to a general fixture used for robotic assembly processes. In particular, a general fixture can include a base and a mesh surface. The mesh surface can have openings that are configured to constrain an orientation of a component that is part of a robotic assembly process. The openings of the mesh surface can have predetermined shapes or external edges to constrain an orientation of a component when the component is at least partially accepted within the openings. The openings on the mesh surface can be substantially similar or the same to each other so that any one of the different components can be accepted at least partially within any one of the openings and be constrained in a respective preferred orientation for the assembly process.

The general nature of the fixture allows the same fixture to work with many different types of components, each having a different respective shape, size, and preferred orientation in a robotic assembly process. One example assembly process is printed circuit (PC) board placement. During PC board placement, a number of differently shaped printed circuit board (PCB) components are precisely placed in specific locations on the PC board. The same general fixture can be used not only for different PCB components, but also for different PC board placement processes.

The term "fixture" used throughout the specification refers to an apparatus configured to temporarily support or hold one or more components during an assembly process, e.g., a robotic assembly process. A fixture can include a base that supports the fixture above a working surface and a mesh surface having multiple openings that constrain an orientation of components placed thereon.

Using a fixture during a robotic assembly process can, for example, secure a mounting point for a component to be assembled, provide support for an assembly process, and increase the accuracy, reliability, and throughput of the assembly process. In particular, a fixture can reduce the complexity of designing an assembly process, allowing for relatively inexperienced technicians to efficiently design an accurate assembly process.

Particular embodiments of the subject matter described in this specification can be implemented to realize one or more of the following advantages. The apparatus and techniques described in this specification can increase the efficiency and throughput of designing, planning for, and performing a robotic assembly process. The general fixture is more versatile than traditional fixtures in that it includes multiple openings that are substantially similar, and each of the multiple openings can be particularly designed so that any one of the openings can accept different components and constrain the components in respective orientations for subsequent assembly operations. In addition, the fixture being general eliminates the need to design and manufacture particular fixtures for particular assembly processes. Moreover, the fixture being general means that it can be used with many different types of robots and can be used for many types of components and many types of assembly processes. The fixture being general also simplifies the motion planning processes and makes the resulting work flow more robust to errors. For example, robots not need to be pre-programmed to specify precise which openings of a fixture to use. Rather, the robots need only to be aware of a particular location on the fixture.

The general nature of the fixture also makes it more effective to use machine learning techniques for robotic motion planning. For example, one problem with reinforcement learning for robotic actions is that the rewards are sparse and do not generalize well. This means that even after training a model successfully, tiny errors in measurement or calibration can result in tasks failing. But when using a general purpose fixture, the precision of the location of components on the fixture becomes less important. Therefore, rewards are more abundant during training, which decreases the cost and time of training. And during execution, the process is more robust and less likely to fail.

In addition, the techniques described in this specification can simplify an optimization process for a multi-robot assembly system. More specifically, the described general fixture can be used as a hand-off or interchange point for two or more robots in a multi-robot assembly system, which can reduce a coupled, non-linear optimization problem of controlling each of the robots in the system into a decoupled, linear optimization problem. The general fixture can unbundle two robotic arms so that each of the two robotic arms can be programmed to move or operate independently, The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
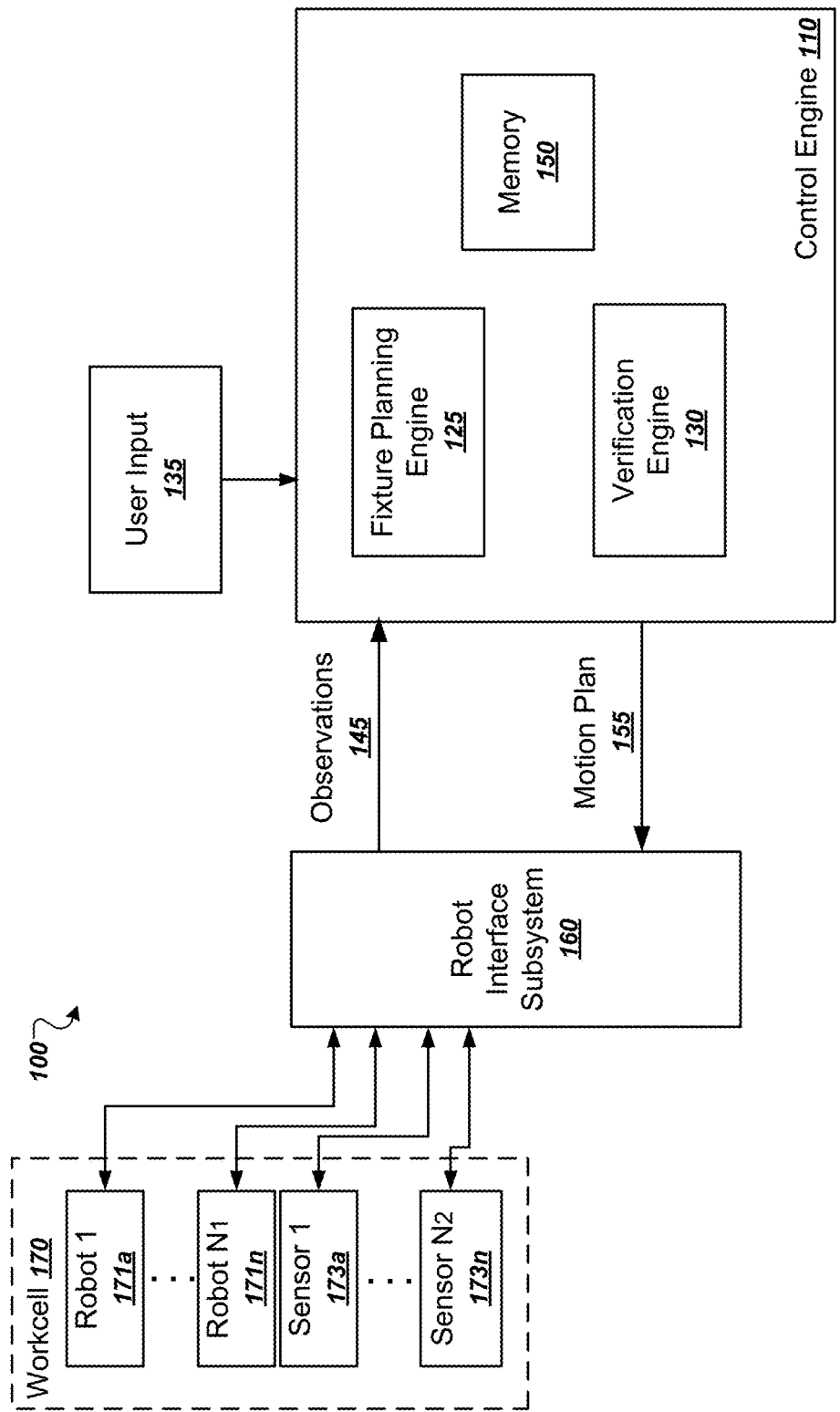
FIG. 1 illustrates an example system to generate a motion plan for one or more robots to perform operations in a workcell.

FIG. 1 illustrates an example system 100 to generate a motion plan 155 for one or more robots 171a-n to perform operations in a workcell 170. The example system 100 is a system implemented on one or more computers in one or more locations, in which systems, components, and techniques described below can be implemented. Some of the components of the system 100 can be implemented as computer programs configured to run on one or more computers. The control engine 145 can include any suitable engines or algorithms configured to generate motion plans 155 after processing corresponding input data.

In FIG. 1, a robot workcell 170 is used as an example of a physical operating environment. The techniques described in this specification can also be used to generate motion plans for robots in other operating environments that are not workcells. In addition, the techniques described in this specification can also be used to generate motion plans for robots in virtual operating environments, e.g., as simulated by engines or processors that are included in the system 100 or external to the system 100.

The system 100 can include a control engine 110 configured to generate one or more motion plans 155 for processing corresponding input data. The motion plan 155 can include data specifying particular poses for causing robots to move at different time steps, for example, a trajectory for a robot or robotic components to follow during a particular time period so that the robot or robotic components can perform a pre-determined task. As a particular implementation in this specification, the motion plan 155 is configured to control or guide robots to assemble one or more components into a PCB using a general fixture.

The generated motion plan 155 is sent to control a motion of one or more robots to perform operations (e.g., performing a task such as assembling multiple components). For simplicity, the term "components" or "assembly components" used in the specification generally refer to elements, objects, or pieces that are to be assembled on a product. For example, the components are through-hole electronics to be assembled on a PC board.

The control engine 110 can provide the generated motion plan 155 to a robot interface subsystem 160 for controlling robot movements. The control engine 110 and the robot interface subsystem 160 are communicatively connected using wired or wireless communications, e.g., Ethernet, WiFi, Bluetooth, or other suitable communicative connections.

The corresponding input data for generating motion plans 155 can include at least observations 145. The robot interface subsystem 160 is configured to provide observations 145 to the control engine 110. The observations 145 can include raw sensor data collected by sensors 173a-n and/or robots 171a-n in the workcell 170, and/or processed sensor data that are processed by the robot interface subsystem 160.

The raw data collected by sensors and/or robots in the workcell 170 can include poses of the robots or robotic joints, arms, or end effectors, positions and dimensions of a general fixture located in the workcell 170, locations and dimensions of trays that store components to be assembled by one or more robots following a particular motion plan 155, or poses of components in the workcell 170. The processed data can be generated based on raw data by filtering erred or outlier raw data or manipulating the raw data. For example, the processed data can include derived data based on the raw data, such as velocity or acceleration of a robotic end effector, mismatches when one or more components are deposited on a general fixture, misplacements or errors when assembling a component into a product (e.g., a PCB). The robot interface subsystem 160 can be configured and deployed on processors that are external to the workcell 170 through wired or wireless communications. Alternatively, the robot interface subsystem 160 can be configured and deployed on one or more sensors and/or robots in the workcell 170.

The corresponding input data can further include user input 135. More specifically, a user can specify parameters to configure control engine 110 for generating a motion plan 155. For example, the user input can include data specifying the number of robots or robotic components used to perform a task, a number and/or types of components to be assembled during an assembly process, a number and/or a type of products to be assembled by the workcell 170, movement constraints for robots, a calibration process, optimization requirements, or other parameters that configure the control engine 110 to process observations 145 for generating motion plans 155.

The control engine 110 can include a fixture planning engine 125 configured to process observations 145 given particular user input 135 and generate a motion plan 155 for controlling one or more robots to perform tasks in the workcell 170.

The fixture planning engine 125 can include different algorithms to generate a plan for using a general fixture in the workcell 170. The control system 110 can generate, based on the plan for using the general fixture, a motion plan 155 so that each robot can move without colliding with each other when performing a task using the general fixture.

The plan for using a general fixture can improve efficiency and reduce cost. For example, the plan for using a general fixture can include data for selecting an arbitrary location in the general fixture (e.g., on a mesh surface of the general fixture) or within the workcell 170 to temporarily receive a component. The arbitrary location is independent of a component type, or an order for picking up and assembling a particular component due to the characteristics of the general fixture. Different components received at arbitrary locations in the general fixture can be constrained in respective, pre-known orientations. In addition, using a general fixture is advantageous over using a special fixture because the plan for using a general fixture does not need to be generated at a high level of precision. Rather, an arbitrary location in the plan can define a location that is near a feature in a general fixture (e.g., an opening). When a component is being placed at an arbitrary location, the component can "feel" its way to be received by the fixture and maintain a pre-known orientation. Furthermore, the arbitrary locations in the general fixture are not pre-determined for a robotic assembly process. The arbitrary locations can be changed on the fly after generating the plan for using the general fixture. In this way, a general fixture can be well utilized and a corresponding assembly process can be robust to different assembly requirements. The details of the general fixture characteristics are described below.

Referring back to the control engine 110, in some implementations, the control engine 110 can include trained machine learning models (such as neural networks) to generate a predicted motion plan for controlling one or more robots. In some implementations, the control engine 110 can generate a swept volume for each robot and determine, based on the swept volumes, respective trajectories for respective robots as a motion plan. In some implementations, the user can prescribe one or more candidate motion plans to be stored in the memory 150 of the control engine 110. The control engine 110 can select one of the candidate motion plans as a motion plan 155 for controlling robots, based on the observations 145, user input 135, and the plan for using a general fixture.

In some implementations, the system can use one or more learning algorithms to generate a motion plan for a robot. A learning algorithm can be a reinforcement learning model, which can receive input data representing an operating environment and actions to be performed by a robot in the environment at each time step, which may rely on hidden features generated for the actions. The hidden features can be used for determining a reward for a robot performing the operations in the corresponding environment. The system can update the motion plan based on the reward so that the updated model is more likely to generate actions that complete the task successfully.

The control engine 110 can further include a verification engine 130. The verification engine 130 is configured to determine whether a generated motion plan is valid, e.g., whether there might be a collision between two or more robots, or whether the motion plan can lead to unstable situations of one or more robots. Determining unstable situations can include, to name just a few examples, determining that an acceleration or velocity for a robot at a time step that exceeds a safety threshold, determining that a change of the acceleration or velocity for a robot exceeds a threshold, or determining that the total energy cost or throughput for the motion plan does not satisfy a predetermined requirement.

The memory 150 included in the control engine 110 can further include historic data for generating motion plans using the control engine 110. The historic data can be analyzed by, e.g., external processors, algorithms, or technicians, to optimize the process of generating a motion plan 155 for robots 171a-n in the workcell 170.

Figure 2:
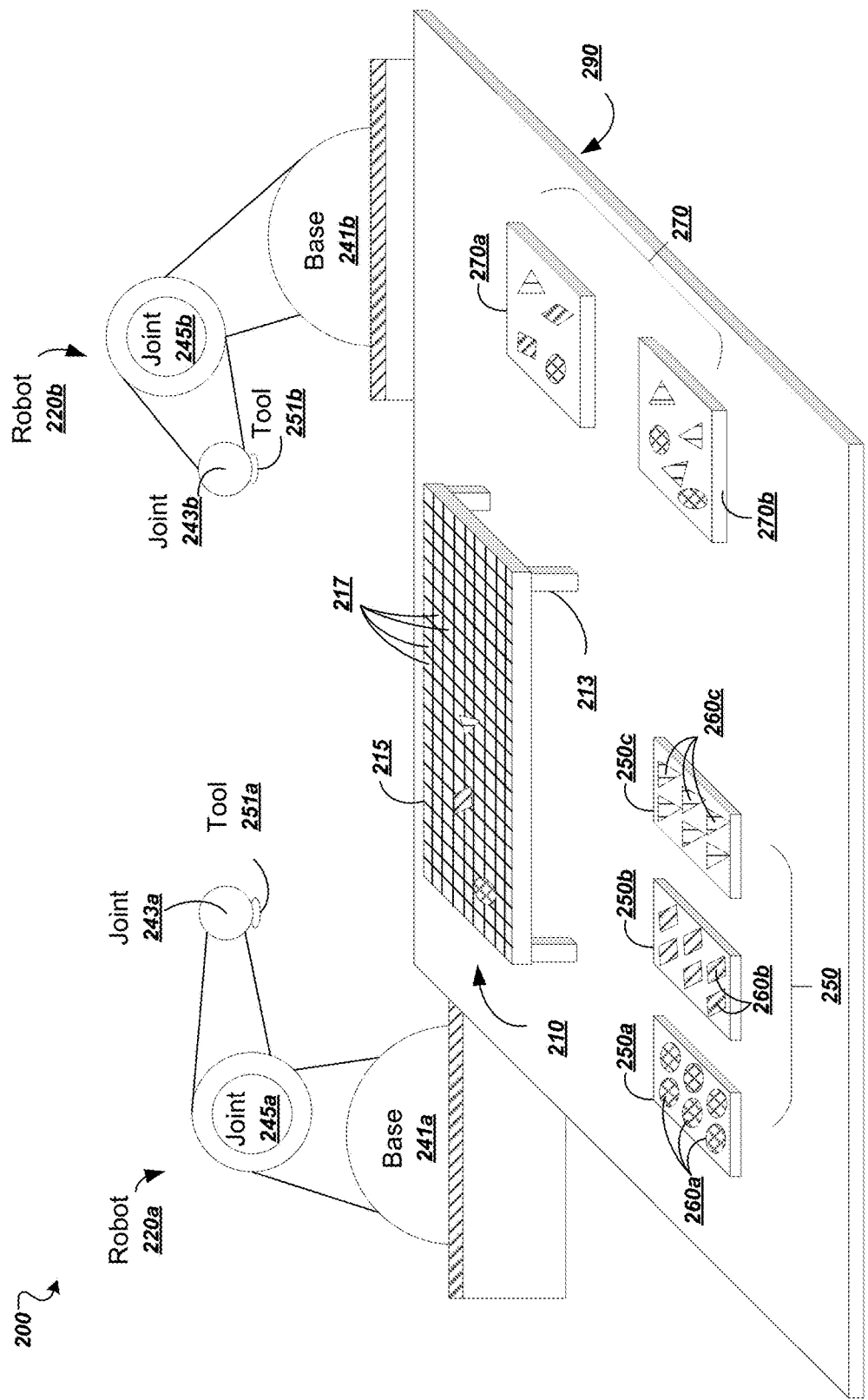
FIG. 2 illustrates a schematic workcell including an example general fixture.

FIG. 2 illustrates an example workcell 200 including an example general fixture 210. The workcell 200 can be equivalent to, for example, the workcell 170 of FIG. 1. For convenience, a system of one or more computers located in one or more locations can, when appropriately programmed, generate a motion plan to control robots in a workcell for performing a task. For example, the system can be the system 100 of FIG. 1. The task, for example, can be assembling different components on a PC board using a general fixture in a workcell.

As shown in FIG. 2, the workcell 200 can include one or more robots, e.g., a first robot 220a and a second robot 220b. Each of the one or more robots can include a base, moveable components connected by one or more joints, and one or more end effectors (or, equivalently, tools). As shown in FIG. 2, the first robot 220a can include a base 241a, movable components (e.g., robotic arms) that are connected by joints 243a and 245a, and a tool 251a. The second robot 220b can include a base 241b, movable components (e.g., robotic arms) that are connected by joints 243b and 245b, and a tool 251b. The robots 220a and 220b can be configured to follow a motion plan to assemble components using a general fixture. The details are described below.

The workcell 200 can further include one or more trays 250 each for storing different components 250a-c. As shown in FIG. 2, the workcell 200 can include three trays 250a, 250b, and 250c. Each of the trays 250a-c can include multiple components of a type. For example, the first tray 250a can include multiple components 260a of a first type, the second tray 250b can include multiple components 260b of a second type, and the third tray 250c can include multiple components 260c of a third type. The components 260a-c can include different types for different assembly processes. For example, for assembling a PCB, the components can include at least one or more of a power switch, a power indicator, a delay range selector, an adapter, an input and/or output switch, an audio and/or video input/output jack, an LED bulb, a motor, a buzzer, a battery, a diode, a transistor PNP or NPN, an integrated circuit, a relay, a capacitor, an inductor, or any other suitable components for a PC board. In some implementations, the components can include through-hole elements including an upper portion and a lower portion. The through-hole elements can be inserted on a corresponding workpiece, e.g., a PC board. The details of the through-hole components are described in connection with FIG. 4.

In addition, each type of components 260a-c can have a different shape or size, e.g., a maximum lateral shape or size, so that each type of components can have respective pre-known orientations when being placed or received in the general fixture 210.

In some implementations, the trays 260a-c can have respective characteristics for sensors and/or robots to determine the locations and stored components of respective trays. For example, the characteristics of a tray can include particular marks or binary codes printed on the outer surface of the tray, a shape, size, or color associated with the tray, or a particular location associated with the tray. Alternatively, the system can include user input to specify a location and a type of components stored in a tray for one or more robots to pick up and place into the general fixture 210.

The workcell 200 can further include a general fixture 210 and one or more PC boards 270a and 270b to receive components 250a-c.

The general fixture 210 can include a base 213 and a mesh surface 215. The base can be any suitable shape to elevate the mesh surface 215 at a particular height over the top surface of a base 290 in the workcell 200. The base 213 can include different shapes. For example, as shown in FIG. 2, base 213 can include four legs/pins extending from a bottom surface of the mesh surface 215. The legs can be located close to the corners of the mesh surface 215.

The mesh surface 215 can have one or more openings 217 that are configured to constrain an orientation of a component when the component is placed or received within the openings 217.

The mesh surface 215 can have edges between adjacent openings 217. In some implementations, the mesh surface 215 can be a wire mesh, e.g., the edges of the mesh surface 215 are wires.

The openings 217 can allow at least a portion of a component to extend through the opening from a top surface to a bottom surface of the mesh surface 215. At least another portion of the component is on the surface when the portion of the component extends through the openings 217, so that a robot can pick up the component from the general fixture 210 by an end effector. As described above, each opening 217 can have a substantially same or similar shape and size so that different types of components, when received by any one of the openings 217, can be constrained to a pre-known orientation. Particularly, because different types of components have different shapes and/or sizes, each component is received in any one of the openings 217 to a different extent with a respective orientation.

In addition, the openings 217 of the mesh surface 215 are independent from the arrangement of components in a workpiece. For example, one or more components can be received in arbitrary openings 217 in the mesh surface. The locations corresponding to the openings 217 need not match locations where these components (e.g., through-hole elements) are to be assembled in a workpiece, e.g., a PCB component, and are in fact usually very differently arranged.

Furthermore, the openings 217 of the mesh surface 215 are independent from holes or through-holes on a workpiece. The openings 217 are designed to temporarily receive a component and constrain the component in a pre-known orientation that is preferable for following assembly operations, whereas the holes or through-holes on a workpiece are used for securing components for the assembly process. For example, when the workpiece is a PCB component, the through-holes on a PC board are used for pins or legs of through-hole elements to extend through, so that following operations such as soldering can be performed to secure the through-hole elements on the PC board. However, the openings 217 are designed and shaped to temporarily receive one or more through-hole elements and constrain them at pre-known orientations.

The mesh surface 215 can be manufactured using 3D printing or molding. Alternatively, the mesh surface 215 can be manufactured by welding or weaving. The mesh surface can include at least one of metal, resin, plastic, textile, fiber, or other suitable materials.

As shown in FIG. 2, the robots 220a or 220b or both can follow a motion plan to assemble components 260a-c to one or more PC boards 270a and 270b. More specifically, one or more robots 220a or 220b can pick up components 260a-c from trays 250a-c, place the components on the general fixture 210 to constrain them into pre-known orientations, and pick them up for assembling on the PC boards 270a and 270b. The details are described in connection with FIG. 5.

In FIG. 2, although there are three trays 250a-c, six components of 260a-c of a respective type in a respective tray, two PC boards 270a and 270b having respective numbers and types of components, two robots 220a and 220b with respective joints, arms and a respective tool. It should be appreciated that these pieces are drawn for the ease of illustration. The numbers for these pieces can be one, two, three, five, ten, or more, and the shapes or sizes for the components 260a-c can be any suitable shapes or sizes that are suitable for assembling a product.

FIGS. 3A-3D each illustrate a top view of an example general fixture 310. The general fixture 310 can be equivalent to the fixture 210 shown in FIG. 2.

Figure 3B:
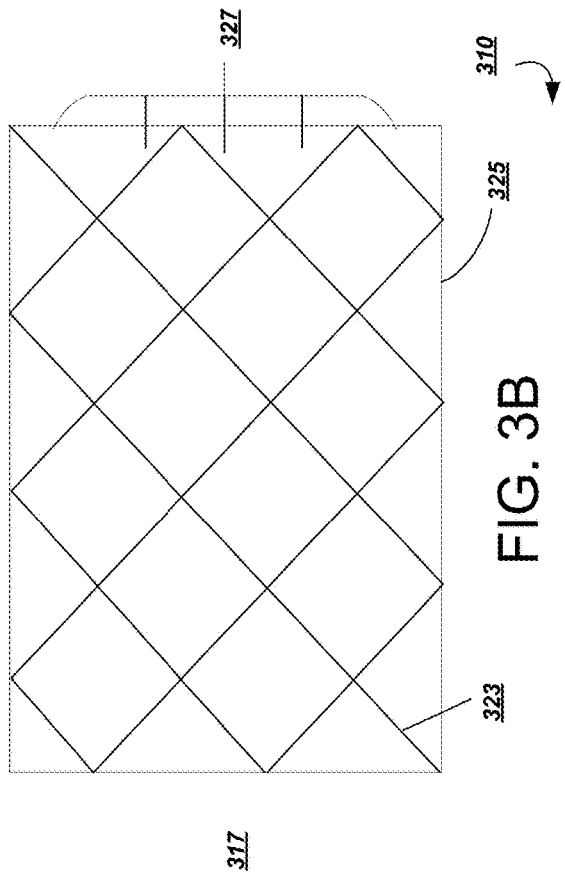
FIGS. 3A-3D each illustrate a top view of an example general fixture.
Figure 3D:
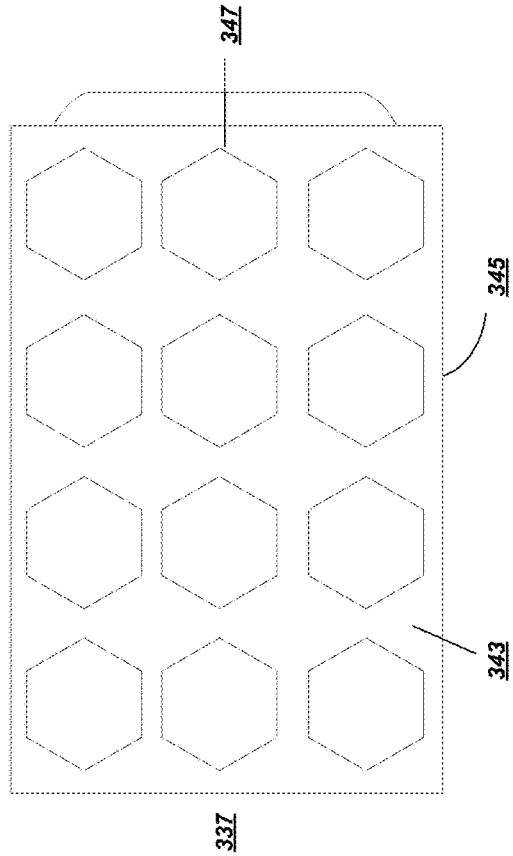
Figure 3A:
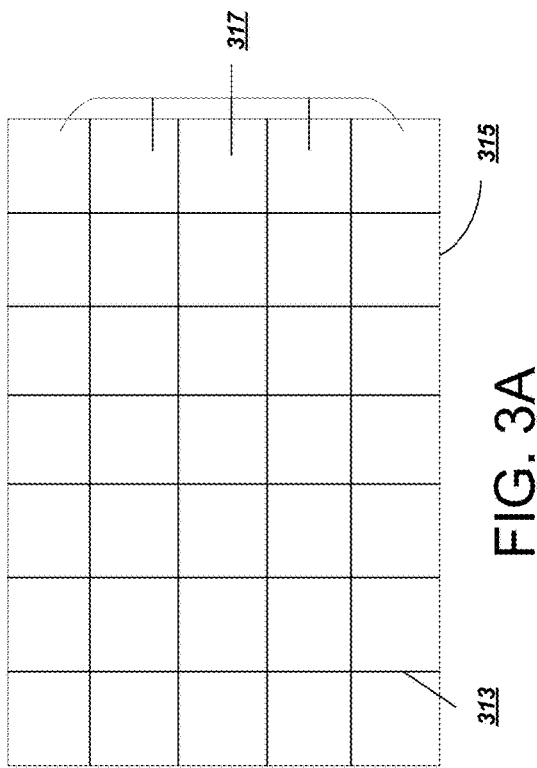
Figure 3C:
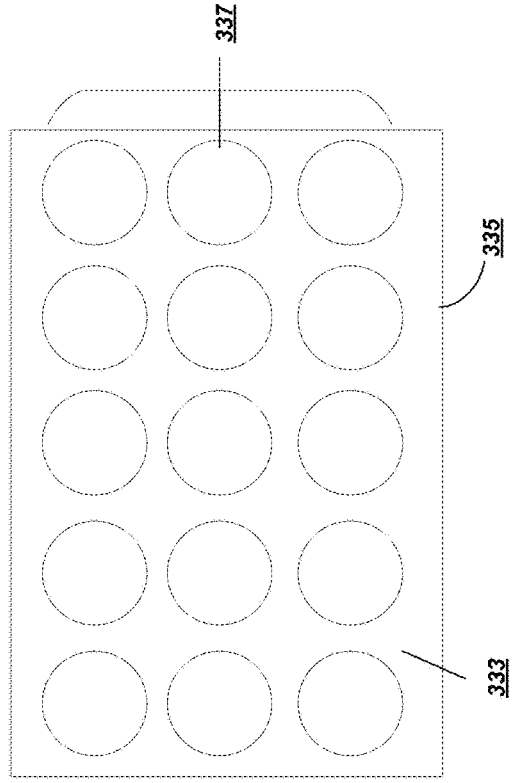

As described above, a general fixture 310 can have a different mesh surface for different assembly processes. As shown in FIG. 3A, an example general fixture 310 can have a mesh surface 315 that includes openings 317 that are substantially rectangular or square. The edges 313 in both directions intersect each other at a substantially perpendicular angle. The edges 313 are represented as a solid line in FIG. 3A, and each edge 313 has a particular width. As shown in FIG. 3B, an example general fixture 310 can have a mesh surface 315 including openings 317 that are substantially diamond-shaped or triangular. The mesh surface 325 can include edges 323 between neighboring openings 327. As shown in FIG. 3C, an example general fixture 310 can have a mesh surface 335 including openings 337 that are substantially circular. The mesh surface 335 can include edges 333 between neighboring openings 337. As shown in FIG. 3D, an example general fixture 310 can have a mesh surface 345 including openings 347 that are substantially hexagonal. The mesh surface 345 can include edges 343 between neighboring openings 347. The size of the openings can depend on the particular application. For example, for PCB components, the openings can be between 1 and 3 mm.

Figure 4:
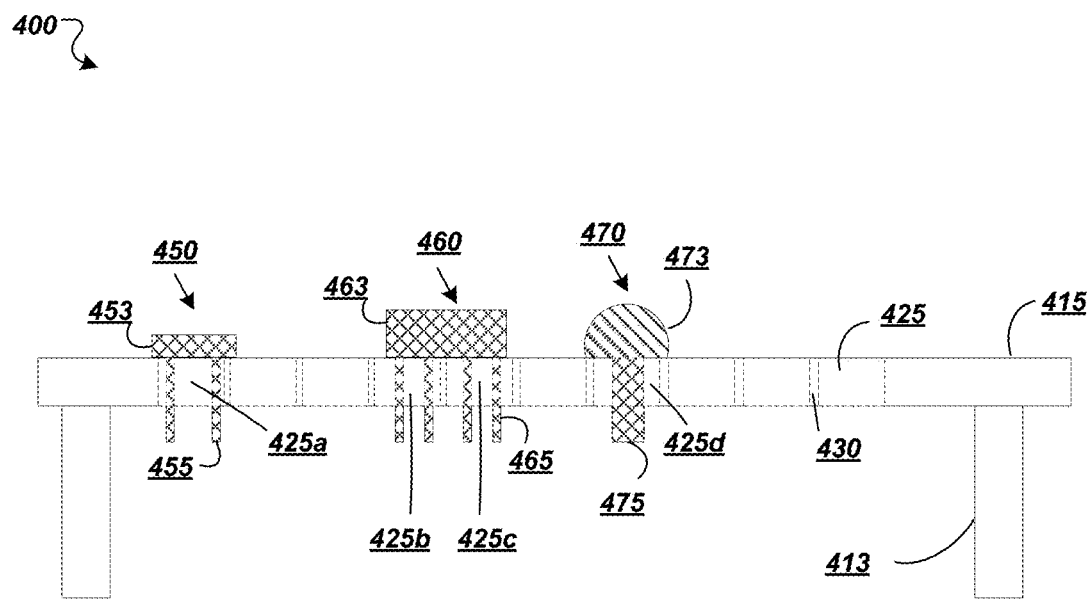
FIG. 4 illustrates a side view of an example general fixture with different components received in respective openings.

FIG. 4 illustrates a side view of an example general fixture 400 with different components received in respective openings 425. The general fixture 400 can be equivalent to the general fixture 210 of FIG. 2, or the general fixture 310 of FIGS. 3A-3D.

As shown in FIG. 4, the general fixture 400 can have a base 413 and a mesh surface 415. The base can include one or more legs extending from the bottom surface of the mesh surface 415. The mesh surface 415 can include multiple openings 424, between which are edges 430. The openings are substantially the same or similar to each other. In some implementations, a first subset of openings are substantially the same or similar to each other in the first subset, and a second subset of openings are substantially the same or similar to each other in the second subset. The openings in the first subset can be different from those in the second subset. The edges 430 between neighboring openings can also be substantially the same or similar to each other.

During an assembly process, one or more different components can be received by one or more openings in the general fixture 400. For example, as shown in FIG. 4, a first component 450 is at least partially received in a first opening 425a, a second component 460 is at least partially received in a second opening 425b and a third opening 425c, and a third component 470 is at least partially received in a fourth opening 425d. Although, as shown in FIG. 4, there are only three components being received in the respective opening (s), it should be appreciated that there could be one, two, four, five, ten, fifty, or more components being received in respective openings of the general fixture 400.

Each component to be assembled during the process can include two portions, e.g., an upper portion and a lower portion. For example, the first component 450 can include an upper portion 453, and a lower portion 455, the second component 460 can include an upper portion 463 and a lower portion 465, and the third component 470 can include an upper portion 473 and a lower portion 475.

Each component can have an upper portion and a lower portion. The upper portion can include different top surfaces, lateral dimensions, and/or overall shapes or topology. The lower portion can include different shapes, sizes, numbers of legs, and tapers. For example, as shown in FIG. 4, the upper portion 453 of the first component 450 can include a flat top surface. The upper portion 453 can include a lateral dimension that is greater than the dimension of the opening 425a, so that at least a portion of the upper portion 453 is above the top surface of the mesh surface 415 (the portion of the upper portion 453 received inside the opening 425a is not shown). In some implementations, the entire upper portion is on the top surface of the general fixture 400, as shown in FIG. 4. The lower portion 455 of the first component 450 can be pins or legs of the first component 450. For example, if the first component 450 is an electronic component for a PC board, the legs 455 can be any shape or size (e.g., a wire) suitable for serving as a conductor, which can be soldered to a conductor pattern on a PC board. The lower portion 455 can also include sockets or indents configured for removable attachment on a PC board. In some implementations, the lower portion 455 can include cylindrical or rectangular rods with or without tapered lower tips.

The second component 460 can include an upper portion 463 that has a dimension greater than a dimension of two openings, 425*b* and 425*c*. The upper portion 463 can be received at least partially in the two openings 425*a*, 425*c*, or on the top surface of the general fixture 400. As described above, the upper portion 463 can include any shape that is suitable for a predetermined assembly process. The second component 460 can further include a lower portion 465 that can be received in respective openings 425*b* and 425*c*. The lower portion 465 can be, for example, legs for the second component 460. The legs can be a rectangular or circular shape with or without tapered tips, or include sockets or indents, as described above.

The third component 470 can include an upper portion 473 that has a curved top surface and is received in an opening 425*d*. The upper portion 473 can be at least partially received in the opening 426*d* with at least a portion above the mesh surface 401. The upper portion 473 can be a sphere or a half-sphere. The third component 470 can include a lower portion 475. The lower portion 475 can be a single leg with a greater size than those of the first and second lower portions 455, 465. As described above, the lower portions can include any number of legs suitable for the assembly process, e.g., one, two, four, six, ten, or more legs.

Figure 5:
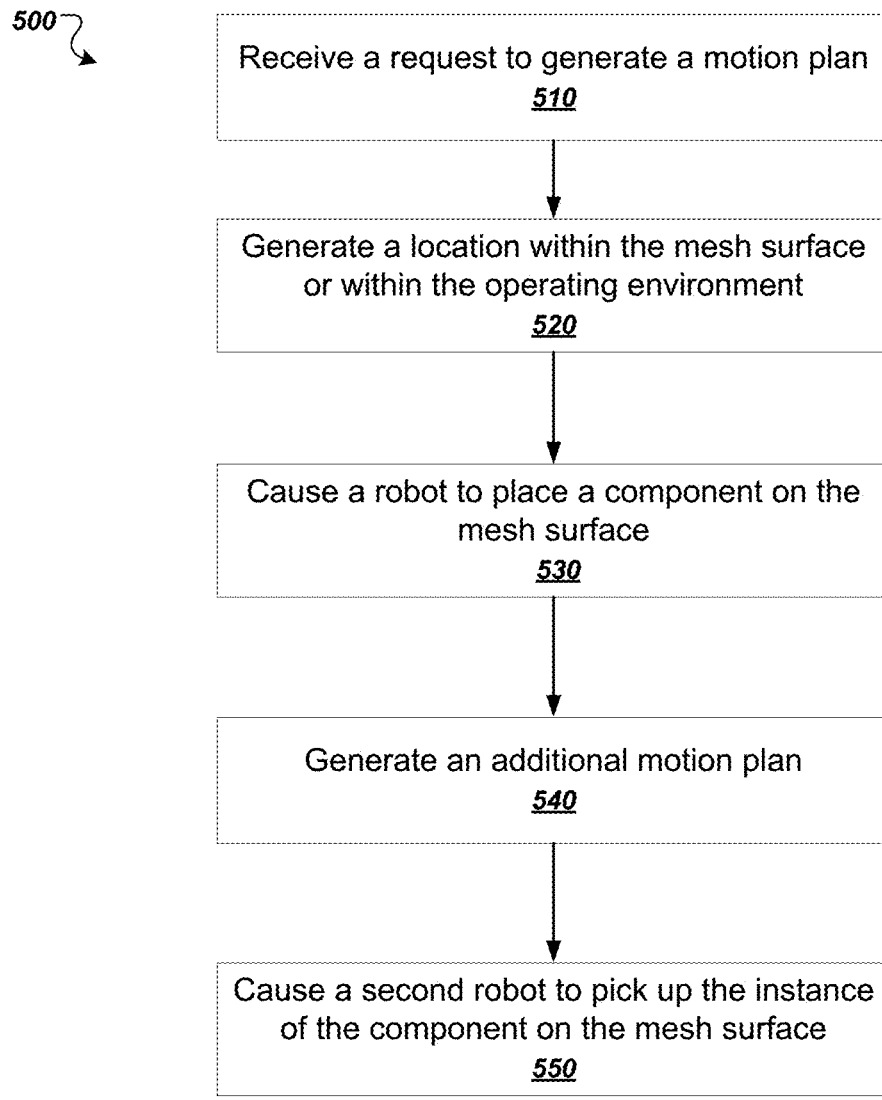
FIG. 5 illustrates an example process of generating a motion plan for one or more robots to perform operations using an example general fixture.

FIG. 5 illustrates an example process 500 of generating a motion plan for one or more robots to perform operations using an example general fixture. For convenience, the process can be performed by a system of one or more computers located in one or more locations. For example, a system 100 of FIG. 1, appropriately programmed, can perform the process 500.

The system receives a request to generate a motion plan (510). The motion plan can be generated and used for manipulating a component for a robotic assembly process in an operating environment. One or more robots, or one or more components that are part of one or more robots are configured to perform the robotic assembly task by following the motion plan. The components belonging to one or more robots can include at least one of a robot arm, an end effector, a joint, or other components suitable for the assembly process. The assembly process includes a general fixture. As described above, the general fixture can include a base and a mesh surface. The mesh surface can include multiple openings that are configured to constrain an orientation of a component when the component is received in any one of the multiple openings.

The system generates the motion plan based on observations collected from a workcell, and optionally user input specifying parameters and/or constraints associated with robot movements. In some implementations, the system determines a location for a general fixture used in the assembly process. For example, the system can determine the location for the general fixture based on the observations collected from sensors and/or robots in a workcell. Alternatively, the system can determine the location for the general fixture based on user input that specifies the location of the general fixture. The location for the general fixture can include data representing locations for the mesh surface of the general fixture.

To generate the motion plan, the system generates a location within the mesh surface or within the operating environment. (520) For example, the system can generate or determine a location that corresponds to an opening of the multiple openings in the mesh surface, so that the motion plan can be configured to cause a robot or robotic component to pick up and deposit an assembly component to the location. The assembly component, after being deposited at the location, can "feel" its way to be received in the corresponding opening of the general fixture at a predetermined orientation. It should be noted that the location does not specify a particular opening of the multiple openings in the mesh surface. In fact, at least a subset of the multiple openings are substantially the same or similar to each other so that there is no need to specify a particular opening. Different components can be received in any one or more of the multiple openings at pre-known orientations.

The system causes a robot to place a component on the mesh surface based on the location (530). In general, the robot can also include a component of the robot, e.g., a robotic arm or end effector. The robot can follow the motion plan to pick up a component from a tray that stores the component, and deposit the component at the location.

In some implementations, the system can determine more than one location, so that the motion plan can cause one or more robots or robotic components to pick up and deposit different components at different locations. The deposition process can be performed by multiple robots in parallel.

The system generates an additional motion plan (540). The system can generate the additional motion plan based on a new location within the mesh surface or within the operating environment. The new location for the additional motion plan can be different from the location for the motion plan. The location does not reference a particular opening of the mesh surface, as described above. For example, the additional motion plan can cause a robot or robotic component to pick up a component received in an opening that corresponds to the location, and assemble it on a product, e.g., a PC board. Similarly, the system can generate the additional motion plan based on multiple different locations within the mesh surface or within the operating environment. The system can control multiple robots or robotic components to operate in parallel following the additional motion plan.

The system causes another robot, different from the robot for the motion plan, to pick up a component received in the mesh surface that corresponds to the new location (550). As described above, the mesh surface provides enough location precision to allow another robot to pick up components from the mesh surface with high reliability. The other robot can then perform a task with the component picked up from the mesh surface. For example, the system can cause the other robot to place the component into an assembly object. To do so, the system can determine a location on the assembly object and cause the robot to place the component at the determined location of the assembly object. As described above, the assembly object can be a PCB, and the determined location of the PCB component can be a through-hole on the PCB.

As described above, the general fixture can be used to decouple the control of one or more robots for manipulating components for an assembly process. Therefore, the motion plan generated in step 510 and the additional motion plan generated in step 540 can be used to cause different robots to perform operations at different stages during the assembly process. For example, the motion plan can cause a robot to move a component from a tray and deposit it onto a general fixture, and the additional motion plan can cause another robot to pick up and assemble onto a product another component received in the general fixture. In some implementations, the motion plan and the additional motion plan can cause two different robots to manipulate components for a common location, e.g., a first robot picks up and places a component at a location within the mesh surface, and a second robot picks up the component from the location and assembles it onto a product. Alternatively, the first motion plan and the second motion plan can cause a common robot to perform the entire assembly operations based on a common location. For example, a first robot can, following a first motion plan, first pick up and deposit a component onto an opening corresponding to the location so that the component is constrained to a pre-known orientation. Then the first robot can pick up and assemble the component from the location following a second motion plan.

In some implementations, the motion plan can be generated by human demonstration. For example, a user can operate a robot to pick up and place a component onto a general fixture, and the system can memorize the motion of the robot operated by the user, and generate a motion plan for the robot. Similarly, the system can generate an additional motion plan for assembling components from the general fixture by human demonstration.

In some implementations, the system can include sensors to capture different views of a general fixture, so that the sensors can collect data representing how one or more components are received in the general fixture. The system can analyze the collected data to determine whether one of the components is not properly received in the openings of the general fixture. Similarly, the system can also include sensors to capture views of a product (e.g., PCB) to determine whether one of the components is not properly assembled on the product. The different views can include a top view, a bottom view, a side review, or other suitable views. To determine whether a component is properly received by the general fixture or the product, the system can, for example, determine based on whether one or more pins or legs are broken or bent above a threshold value, or based on whether a component is broken or damaged based on the collected sensor data.

The system can generate one or more motion plans using machine learning techniques. For example, a trained neural network is configured to generate a motion plan for a robot based on a determined location. In addition, the system can implement reinforcement learning techniques to optimize the robotic assembly process. For example, the system can determine a reward based on a total throughput for the assembly process, and determine multiple motions plan for different robots, where each robot is caused to perform operations associated with a single stage (e.g., a first stage of picking up a component and deposit it on a general fixture, or a second stage of picking up and assembling the component from the general fixture) of the assembly process. In some implementations, the system can assign a first subset of robots to perform the first stage and a second subset of robots to perform the second stage to optimize the throughput. For example, 50% of the robots are assigned to perform the operations in the first stage, and 50% of the robots are assigned to perform the operations in the second stage. The ratios can be any arbitrary number from zero to one, determined from the system or the reinforcement learning techniques.

The system can also include additional sensors for the assembly process to ensure components are properly assembled. For example, one or more force sensors can be deployed on end effectors of robots or on the top surface of a PC board to determine whether a force for assembling a component does not satisfy a threshold. For example, the force does not satisfy a threshold when the force value is greater than a predetermined threshold value. Alternatively, the sensors can include image sensors to collect data, which can be analyzed by the system to determine whether one or more components are properly assembled, e.g., properly inserted, into a product, e.g., a PC board.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a fixture including a base and a mesh surface, the mesh surface having openings that are configured to constrain the orientation of a component that is part of a robotic assembly process.

Embodiment 2 is the fixture of Embodiment 1, wherein the mesh surface is a wire mesh.

Embodiment 3 is the fixture of Embodiment 1 or 2, wherein the component has through-hole elements and wherein the openings are configured to accept the through-hole elements in order to constrain the orientation of the component.

Embodiment 4 is the fixture of Embodiment 3, wherein the openings are configured to accept through-hole elements of printed circuit board components.

Embodiment 5 is the fixture of Embodiment 4, wherein the openings of the mesh do not match the arrangement of the through-hole elements.

Embodiment 6 is the fixture of Embodiment 5, wherein the openings of the mesh surface do not correspond to through holes on a workpiece.

Embodiment 7 is a method including: receiving a request to generate a motion plan for manipulating a component that is part of a robotic assembly process in an operating environment, wherein the operating environment comprises a fixture having a base and a mesh surface, the mesh surface having openings that are configured to constrain the orientation of the component that is part of the robotic assembly process; and in response, generating a motion plan that when executed causes a robot to place an instance of the component on the mesh surface.

Embodiment 8 is the method of Embodiment 7, wherein generating the motion plan comprises generating a location within the mesh surface or within the operating environment.

Embodiment 9 is the method of Embodiment 8, wherein the motion plan does not specify a particular opening of the mesh surface.

Embodiment 10 is the method of any one of Embodiments 7-9, further comprising generating an additional motion plan that when executed causes a second robot to pick up the instance of the component on the mesh surface.

Embodiment 11 is the method of Embodiment 10, wherein generating the additional motion plan comprises using a location within the mesh surface or within the operating environment without referencing a particular opening of the mesh surface.

Embodiment 12 is the method of any one of Embodiments 7-11, wherein the mesh surface is a wire mesh.

Embodiment 13 is the method of any one of Embodiments 1-12, wherein the component has through-hole elements and wherein the openings are configured to accept the through-hole elements in order to constrain the orientation of the component.

Embodiment 14 is the method of Embodiment 13, wherein the openings are configured to accept through-hole elements of printed circuit board components.

Embodiment 15 is the method of any one of Embodiments of 7-14, further comprising: updating the motion plan for the robot using a reinforcement learning model.

Embodiment 16 is the method of any one of Embodiment of 10-15, further comprising: updating the motion plan for the second robot using a reinforcement learning model.

Embodiment 17 is a system comprising one or more computers and one or more storage devices storing instructions that are operable, when executed by the one or more computers, to cause the one or more computers to perform the method of any one of embodiments 7-16.

Embodiment 18 is a computer storage medium encoded with a computer program, the program comprising instructions that are operable, when executed by data processing apparatus, to cause the data processing apparatus to perform the method of any one of embodiments 7-16.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:
   receiving a request to generate a motion plan for manipulating a component that is part of a robotic assembly process in an operating environment, wherein the operating environment comprises a fixture having a base and a mesh surface, the mesh surface having openings that are configured to constrain an orientation of the component that is part of the robotic assembly process;
   in response, generating a motion plan that when executed causes a robot to place an instance of the component on the mesh surface; and
   generating an additional motion plan that when executed causes a second robot to pick up the instance of the component on the mesh surface.

2. The method of claim 1, wherein generating the motion plan comprises generating a location within the mesh surface or within the operating environment.

3. The method of claim 2, wherein the motion plan does not specify a particular opening of the mesh surface.

4. The method of claim 1, wherein generating the additional motion plan comprises using a location within the mesh surface or within the operating environment without referencing a particular opening of the mesh surface.

5. The method of claim 1, wherein the mesh surface is a wire mesh.

6. The method of claim 1, wherein the component has through-hole elements and wherein the openings are configured to accept the through-hole elements in order to constrain the orientation of the component.

7. The method of claim 6, wherein the openings are configured to accept through-hole elements of printed circuit board components.

8. The method of claim 1, further comprising: updating the motion plan for the robot using a reinforcement learning model.

9. The method of claim 1, further comprising: updating the motion plan for the second robot using a reinforcement learning model.

10. A system comprising one or more computers and one or more storage devices storing instructions that when executed by one or more computers cause the one or more computers to perform respective operations, the operations comprising:

receiving a request to generate a motion plan for manipulating a component that is part of a robotic assembly process in an operating environment, wherein the operating environment comprises a fixture having a base and a mesh surface, the mesh surface having openings that are configured to constrain an orientation of the component that is part of the robotic assembly process;

in response, generating a motion plan that when executed causes a robot to place an instance of the component on the mesh surface; and generating an additional motion plan that when executed causes a second robot to pick up the instance of the component on the mesh surface.

11. The system of claim 10, wherein generating the additional motion plan comprises using a location within the mesh surface or within the operating environment without referencing a particular opening of the mesh surface.

12. The system of claim 10, wherein generating the motion plan comprises generating a location within the mesh surface or within the operating environment.

13. The system of claim 10, wherein the motion plan does not specify a particular opening of the mesh surface.

14. The system of claim 10, wherein the component has through-hole elements and wherein the openings are configured to accept the through-hole elements in order to constrain the orientation of the component.

15. The system of claim 10, wherein the openings are configured to accept through-hole elements of printed circuit board components.

16. The system of claim 10, wherein the operations further comprise: updating the motion plan for the robot using a reinforcement learning model.

17. The system of claim 10, wherein the operations further comprise: updating the motion plan for the second robot using a reinforcement learning model.

18. One or more non-transitory computer-readable storage media storing instructions that when executed by one or more computers cause the one or more computers to perform operations comprising:

receiving a request to generate a motion plan for manipulating a component that is part of a robotic assembly process in an operating environment, wherein the operating environment comprises a fixture having a base and a mesh surface, the mesh surface having openings that are configured to constrain an orientation of the component that is part of the robotic assembly process;

in response, generating a motion plan that when executed causes a robot to place an instance of the component on the mesh surface; and generating an additional motion plan that when executed causes a second robot to pick up the instance of the component on the mesh surface.

19. The one or more computer-readable storage media of claim 18, wherein the operations further comprise: updating the motion plan for the robot using a reinforcement learning model.

20. The one or more computer-readable storage media of claim 18, wherein the operations further comprise: updating the motion plan for the second robot using a reinforcement learning model.

\* \* \* \* \*